US006835093B1

(12) United States Patent
Griffin et al.

(10) Patent No.: US 6,835,093 B1
(45) Date of Patent: Dec. 28, 2004

(54) MULTIPLE JACK BULKHEAD FEEDTHROUGH ADAPTER

(75) Inventors: James P. Griffin, Wauwatose, WI (US); Thomas R. Van Hecke, Watertown, WI (US)

(73) Assignee: PIC Wire & Cable/The Angelus Corporation, Sussex, WI (US)

( * ) Notice: Subject to any disclaimer, the term of this patent is extended or adjusted under 35 U.S.C. 154(b) by 0 days.

(21) Appl. No.: 10/319,203

(22) Filed: Dec. 13, 2002

(51) Int. Cl.[7] ........................... H01R 13/73; H02B 1/01
(52) U.S. Cl. ..................................... 439/551; 439/540.1
(58) Field of Search .............................. 439/551, 540.1, 439/638, 578, 579

(56) References Cited

U.S. PATENT DOCUMENTS

| | | | |
|---|---|---|---|
| 3,566,334 | A | 2/1971 | Ziegler, Jr. |
| 3,856,375 | A | 12/1974 | Muench |
| 4,938,707 | A | 7/1990 | Guimond et al. |
| 5,002,502 | A | 3/1991 | Hill |
| 6,146,192 | A | 11/2000 | Cabalka et al. |
| 6,174,206 | B1 | 1/2001 | Yentile et al. |
| 6,261,124 | B1 | 7/2001 | Brock |

FOREIGN PATENT DOCUMENTS

| | | |
|---|---|---|
| JP | 2000-82547 | 3/2000 |

*Primary Examiner*—Javaid H. Nasri
(74) *Attorney, Agent, or Firm*—Reinhart Boerner Van Deuren s.c.

(57) ABSTRACT

An adapter and a method for the use thereof are disclosed for accommodating multiple cables or other electrical wiring through a minimal bulkhead aperture area. The adapter includes multiple jacks to make efficient use of aircraft bulkhead aperture area. The bulkhead feedthrough adapter has multiple jacks with any one or more of a number of different types of connectors for application in the electrical arts, and which may be used in industrial settings including but not limited to the aviation industry.

18 Claims, 3 Drawing Sheets

FIG. 4
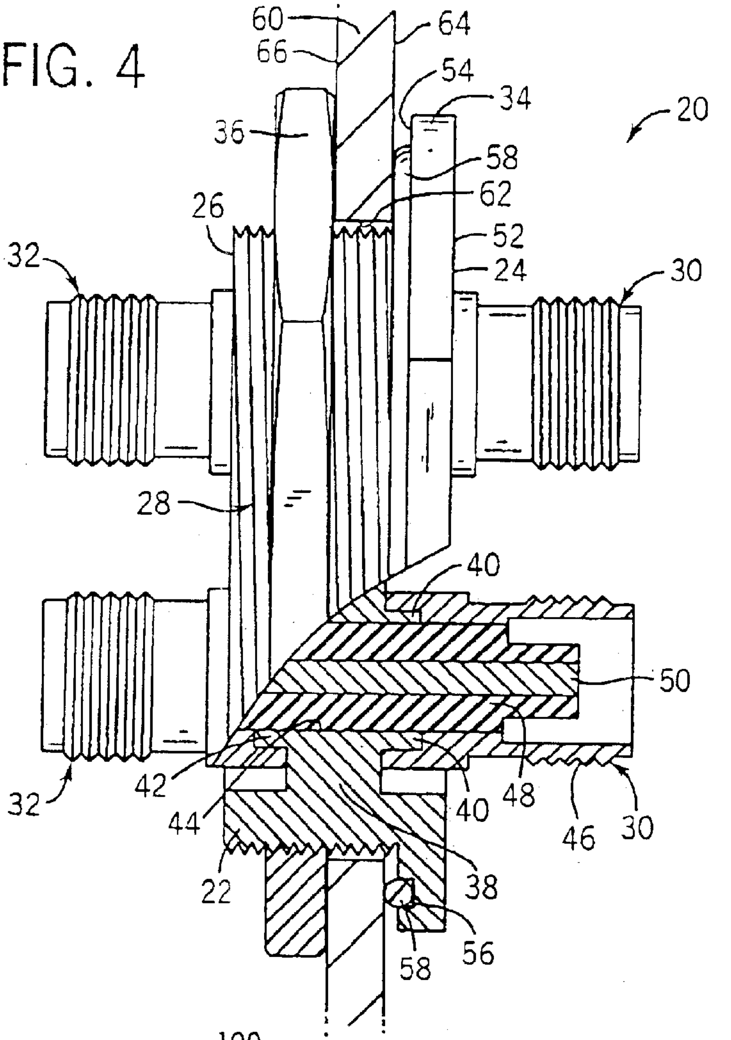
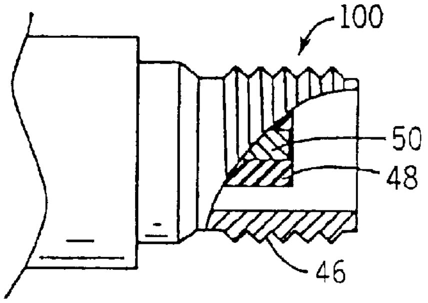
FIG. 7
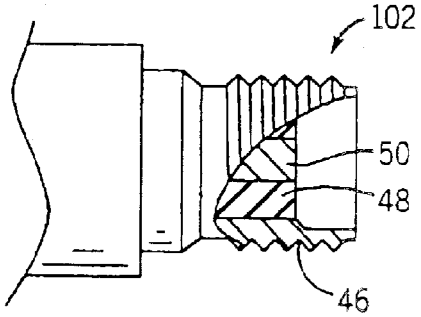
FIG. 8
FIG. 9
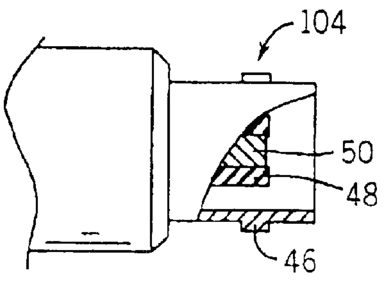

MULTIPLE JACK BULKHEAD FEEDTHROUGH ADAPTER

BACKGROUND OF THE INVENTION

Field of the Invention

The present invention relates generally to feedthrough adapters, and more particularly to an aircraft bulkhead feedthrough adapter, which includes multiple feedthrough jacks in a single feedthrough adapter to enable efficient use of minimal aircraft bulkhead aperture area.

It only takes one quick glance into the cockpit of an aircraft to be utterly amazed at all the knobs, switches, gauges, and dials. While most people take the instrument panel and the electrical underpinnings of an aircraft for granted, those in the aircraft manufacturing industry do not. The challenge for aircraft manufacturers is how to manage the large number of different electrical cables and other wiring that contribute to the proper functioning of an aircraft. Of particular concern is the efficient placement of electrical cables and wiring through bulkhead areas.

Typically, aircraft bulkheads have pre-sized apertures through which various electrical control cables and other related wiring must be placed. Since space within the bulkhead is at a premium, and since in modern aircraft there are many cables, wires, and other conduits in general, it is desirable to economize existing space. There are typically a number of coaxial cables in a typical aircraft for which bulkhead feedthrough adapters are used.

Generally, bulkhead feedthrough adapters include two female coaxial connectors located back-to-back in an adapter which is mounted in a bulkhead aperture. The bulkhead feedthrough adapter is thus used to join two coaxial cables, one on each side of the bulkhead. Two types of bulkhead feedthrough adapters are most frequently used: (1) a bulkhead feedthrough adapter with a round, threaded body and a flange located at one end of the body, with a nut being used to retain it in place in the bulkhead; and (2) a bulkhead feedthrough adapter with a square flange having holes in the four corners of the flange, which is screwed or bolted into place on a bulkhead to cover an aperture in the bulkhead.

In either case, a single cable having a male connector is located on each side of the bulkhead and is connected to the adapter jack. Since there are numerous cables and other electrical wiring, adequate bulkhead space becomes a concern. To further complicate matters, today's technological advances have increased the number of cables and other wiring present in aircraft.

Bulkhead aperture area remains a concern in older aircraft also. For example, earlier aircraft models are frequently updated with additional, essential electronic components, which further add to the number of cable and other wiring that need to be placed through minimal bulkhead aperture area. Accordingly, older aircraft that are being updated to retrofit new components may have difficulty accommodating the increase in cables and other wiring.

Previously known devices have done nothing to address the above concerns. For example, U.S. Pat. No. 4,938,707 to Guimond et al. (the "'707 patent"), which patent is hereby incorporated herein by reference, describes a multimate coaxial adapter which can be terminated with one of several other types of connectors, but which is wholly inapplicable for use in combination with an aircraft bulkhead aperture. Specifically, the device of the '707 patent is unsuitable for use with the apertures in aircraft bulkhead surfaces.

The drawbacks of the previously known devices have been known for some time without any marked improvement thereto occurring to date. Consequently, the aircraft manufacturing industry is in dire need of a novel device and a method for efficiently managing the multitude of cables and wiring that are present within an aircraft and which need to pass through a bulkhead.

It is accordingly the primary objective of the present invention that it provide a bulkhead feedthrough adapter no larger than previously known adapters for use with pre-existing and new aircraft bulkhead apertures.

It is another objective of the present invention that the bulkhead feedthrough adapter include multiple jacks to enable efficient use of minimal aircraft bulkhead aperture area.

It is an additional objective of the present invention that it provide a mounting mechanism which is adapted to engage the bulkhead surface surrounding a bulkhead aperture.

It is yet another objective of the present invention that it provide a bulkhead feedthrough adapter having multiple jacks which may have different types of connectors for application in any of a number of electrical arts, and which may be used in unlimited industrial settings not necessarily being limited to the aviation industry.

The multiple jack bulkhead feedthrough adapter of the present invention must also be of construction that is both durable and long lasting, and it should also require little or no maintenance to be provided by the user throughout its operating lifetime. In order to enhance the market appeal of the multiple jack bulkhead feedthrough adapter of the present invention, it should also be of inexpensive construction to thereby afford it the broadest possible market. Finally, it is also an objective that all of the aforesaid advantages and objectives of the multiple jack bulkhead feedthrough adapter of the present invention be achieved without incurring any substantial relative disadvantage.

SUMMARY OF THE INVENTION

The disadvantages and limitations of the aforementioned background art are overcome by the present invention. With this invention, multiple cables or other electrical wiring can be accommodated through aircraft bulkhead apertures of minimal area using a multiple jack bulkhead feedthrough adapter that is not substantially larger than previously known adapters.

The present invention provides a multiple jack bulkhead feedthrough adapter for mounting in an aperture in the bulkhead of an aircraft, including a base having a first or forward end and a second or rearward end. At least two jacks extend from each of the first end and second end, respectively. A mounting portion, such as a flange or plate, is located generally perpendicular to the base at or near an end thereof. Finally, at least one fastener is employed to secure the multiple jack bulkhead feedthrough adapter to an aircraft bulkhead at the location of an aperture extending therethrough.

Each embodiment of the present invention also includes at least one electrical interconnection between pairs of aligned jacks, which opposably extend from the first and second ends, respectively, of each base. Further, each mounting portion is characterized by opposing inner and outer surfaces, at least one of the surfaces being adapted to engage at least two, but preferably all, locations of peripheral bulkhead surface adjacent to a bulkhead aperture.

A first preferred embodiment of the present invention includes a generally cylindrical, threaded base having a forward and rearward end. A flange is spaced inwardly from both the forward and rearward ends of the base. The generally cylindrical nature of the base enables it to be easily inserted into most bulkhead apertures, the majority of which are generally circular in shape. Additionally, because the base is both cylindrical and threaded, it is adapted to accommodate multiple varieties of fasteners.

At least one jack extends from each end of the base, forming at least one aligned opposing pair of extending jacks. An electrical interconnection links each aligned opposing pair of extending jacks. The current embodiment takes into consideration that multiple jacks can extend from each end of the base, creating multiple aligned opposing pairs of extending jacks. But, it is preferred that at least two jacks extend from each of the forward and rearward ends of the base. Extending jacks are adjacently separated by distance "D." It is preferred that the distance "D" between each adjacent jack be equivalent although additional or fewer jacks can also be accommodated, which may alter distance "D" between each adjacent jack.

In accordance with the above, when multiple jacks are present, each adjacent jack can extend at identical lengths "L" from the common end of the base it shares with the other adjacent jacks. But, it is also contemplated that each adjacent jack can extend at different lengths "L" from the common end of the base it shares with the other adjacent jacks. For example, where four pairs of aligned opposing jacks are present (i.e. jacks 1 through 4), jacks 1 and 3 extend at lengths "L" from the forward end of the base while jacks 2 and 4 extend at lengths "L+1" from the forward end of the base. Such an extension pattern allows a user to connect a cable to one jack without another, adjacent jack interfering with the user's hand movements.

Extending outward from an area of the cylindrical base near its forward end is a generally radial flange, which identifies a mounting portion. The flange, which includes an inner and outer surface, has within its inner surface an annular groove. The annular groove is adapted to partially receive a sealing member, such as an O-ring. It is preferred that the O-ring be at least partially recessed such that a portion extends above the plane of the inner surface. Alternatively, the O-ring can be flush with the inner surface of the mounting portion.

The sealing member acts to engagingly seal against at least two locations of peripheral bulkhead surface adjacent to the bulkhead aperture. However, because of its manufacture, the O-ring sealing member present within the inner surface of the mounting portion can engagingly seal against the entire peripheral bulkhead surface adjacent to the bulkhead aperture.

It is preferred that a fastener, such as a threaded nut, be adapted to secure the first preferred embodiment of the multiple jack bulkhead feedthrough adapter in place within a bulkhead aperture. However, because of the base's generally cylindrical shape, various other fasteners such as, but not limited to, spring washers, lock washers, hose clamps, or the like can be utilized.

Use of the preceding embodiment of the present invention is initiated by first inserting the rearward portion of the multiple jack bulkhead feedthrough adapter into a bulkhead aperture. A user will understand that insertion is complete when the sealing member of the inner surface of the mounting portion engages at least two, but preferably all, locations of peripheral bulkhead surface adjacent to the bulkhead aperture. At that point, a fastener, such as a threaded nut, is securably affixed to the threaded portion of the generally cylindrical base, thereby "sandwiching" peripheral bulkhead surface adjacent to the bulkhead aperture between the sealing member of the mounting portion and the fastener.

Once in place, varying types of cables can be connected to the multiple jack bulkhead feedthrough adapter. Although it is contemplated that the jacks of the present invention can be of any commercially known format for acceptance of any cable interface, it is preferred that the jacks be at least one of a TNC, BNC, or SMA jack format.

The present invention also provides for an alternative preferred embodiment. Specifically, in contrast to the preceding first preferred embodiment, the alternative embodiment includes one or more cylindrical bases, which generally define jack sleeves. Each generally cylindrical jack sleeve has a first end and a second end. Each jack sleeve further includes an annular outwardly extending flange, which is intermediately located between the first and second ends of the jack sleeve. The annular outwardly extending flange serves as an annular contact point for connection to a generally rectangular mounting plate. It is preferred that one jack extend from each end of each jack sleeve, forming at least one aligned opposing pair of extending jacks. Each set of aligned opposing pair of extending jacks is electrically interconnected. In consideration of the above, it is preferred that the alternative embodiment of the multiple jack bulkhead feedthrough adapter include at least two aligned opposing pairs of jacks.

The mounting plate of the alternative preferred embodiment is generally rectangular and defines a mounting portion. The mounting plate includes inner and outer opposing surfaces, peripheral fastener apertures, and multiple base apertures for receipt of a corresponding number of cylindrical jack sleeve bases.

The inner surface of the plate is adapted to receive and affix to the annular outwardly extending flange of each jack sleeve. While it is preferred that the mounting plate attach to the annular flange of each jack sleeve through a solder connection, other connections, such as, but not limited to, interference fit, spot-welding, adhesives, or the like are also contemplated. Once the annular flange is connected to the inner surface of the plate, the jack sleeve and aligned opposing pair of extending jacks will be situated generally perpendicular with respect to the plane of the inner and outer mounting plate surfaces.

In situations where there are multiple pairs of aligned opposing extending jacks, they are adjacently positioned within the plate at distances "D." Such a placement maximizes the number of jacks that can be positioned within the portion of the plate that corresponds to the size of available bulkhead aperture. Thus, in one embodiment, the center-to-center distance or separation "D" between adjacent jacks can be the same.

However, different spacings can be used between adjacent jacks depending on the number and configuration of jacks that the multiple jack bulkhead feedthrough adapter includes. While it is preferred that the multiple jack bulkhead feedthrough adapter of the alternative preferred embodiment include four pairs of aligned opposing extending jacks, it may include more or less jacks.

It is preferred that adjacent jacks, as described above, extend from each end of the jack sleeves at different lengths "L." For explanation purposes, where jacks 1 through 4 (each jack extending from the forward end of a jack sleeve) are adjacently positioned, it is preferred that jacks 1 and 3 extend at lengths "L" from the forward end of their corresponding jack sleeves while jacks 2 and 4 extend at lengths "L+1" from the forward end of their corresponding jack sleeves. In short, the multi-length jacks extend allow a user to easily connect a cable to one jack without another adjacent jack interfering with the user's hand movements. Alternatively, the adjacent jacks can extend at identical lengths.

Proper use of the alternative preferred embodiment is initiated by inserting the rearward ends of each positioned jack sleeve, and the jacks that extend from them, into a bulkhead aperture. Upon engagement of the outer surface of the plate against at least two, but preferably all, locations of peripheral bulkhead surface adjacent to the bulkhead aperture, insertion is complete. At that point, at least one fastener such as, but not limited to, a bolt and nut, rivet, cotter pin, or the like, is employed to secure the multiple jack bulkhead feedthrough adapter in place in the bulkhead aperture.

Once in place, varying types of cables can be connected to the multiple jack bulkhead feedthrough adapter. Although it is contemplated that the jacks of the present invention can be of any commercially known format for acceptance of any cable interface, it is preferred that the jacks be at least one of a TNC, BNC, or SMA jack format.

In accordance with the structure of the preceding preferred embodiments, also contemplated is a method of efficiently placing multiple cables through minimal aircraft bulkhead aperture area. Specifically, the method includes providing a multiple jack bulkhead feedthrough adapter, mounting the multiple jack bulkhead feedthrough adapter in an aircraft bulkhead aperture, securing the multiple jack bulkhead feedthrough adapter in the aircraft bulkhead aperture, and connecting multiple cables to the multiple jack bulkhead feedthrough adapter.

It may therefore be seen that the present invention teaches a bulkhead feedthrough adapter no larger than previously known adapters for use with pre-existing and new aircraft bulkhead apertures, wherein the bulkhead feedthrough adapter includes multiple jacks so as to make efficient use of minimal aircraft bulkhead aperture area.

Additionally, the present invention demonstrates a novel securement approach to a bulkhead aperture, whereby the device is adapted to engagingly secure to at least two, but preferably all, locations of peripheral bulkhead surface adjacent to a bulkhead aperture. Accordingly, the bulkhead feedthrough adapter has multiple jacks with multi-variant types of connectors for application in any of a number of electrical arts, and which may be used in unlimited industrial settings thereby not being limited to the aviation industry.

The multiple jack bulkhead feedthrough adapter of the present invention is of a construction which is both durable and long lasting, and which will require little or no maintenance to be provided by the user throughout its operating lifetime. The multiple jack bulkhead feedthrough adapter of the present invention is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present invention are best understood with reference to the drawings, in which:

FIG. 4 is a partially cut-away side view of the multiple jack bulkhead feedthrough adapter illustrated in FIGS. 1 through 3, shown installed into an aircraft bulkhead;

FIG. 7 is a partially cut-away SMA jack that can be used as any one or more of the jacks in the multiple jack bulkhead feedthrough adapter of the present invention;

FIG. 8 is a partially cut-away TNC jack that can be used as any one or more of the jacks in the multiple jack bulkhead feedthrough adapter of the present invention; and FIG. 9 is a partially cut-away BNC jack that can be used as any one or more of the jacks in the multiple jack bulkhead feedthrough adapter of the present invention.

DETAILED DESCRIPTION OF THE PREFERRED EMBODIMENT

Figure 1:
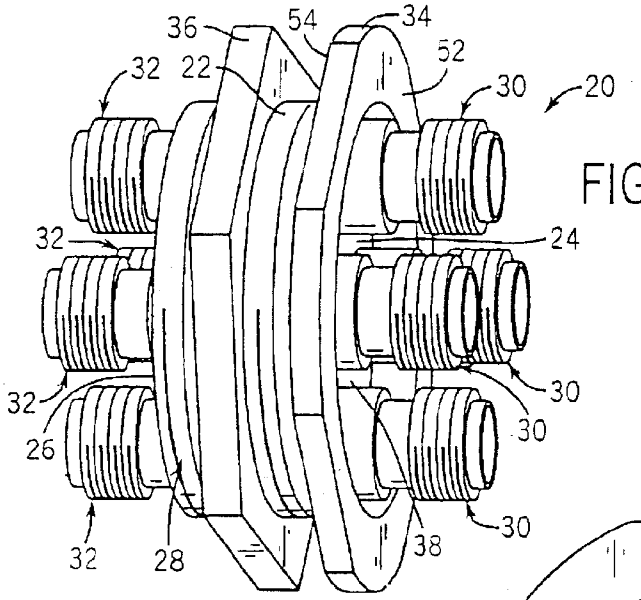
FIG. 1 is a perspective view of a multiple jack bulkhead feedthrough adapter which is constructed in accordance with a first embodiment of the present invention, showing a fastener nut mounted thereupon.
Figure 2:
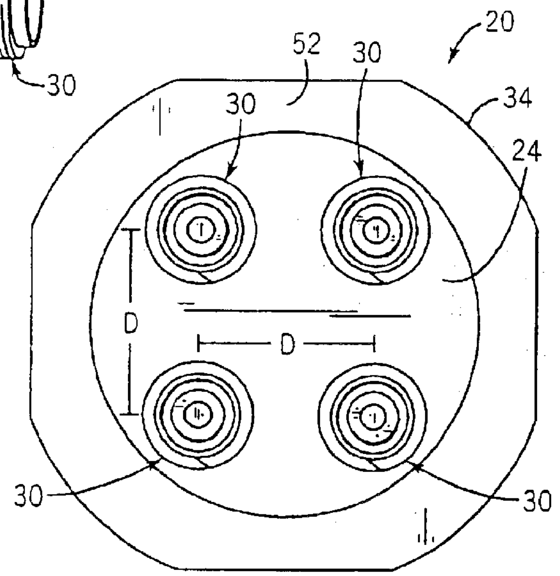
FIG. 2 is a front plan view of the multiple jack bulkhead feedthrough adapter illustrated in FIG. 1 with the fastener nut removed for clarity.
Figure 3:
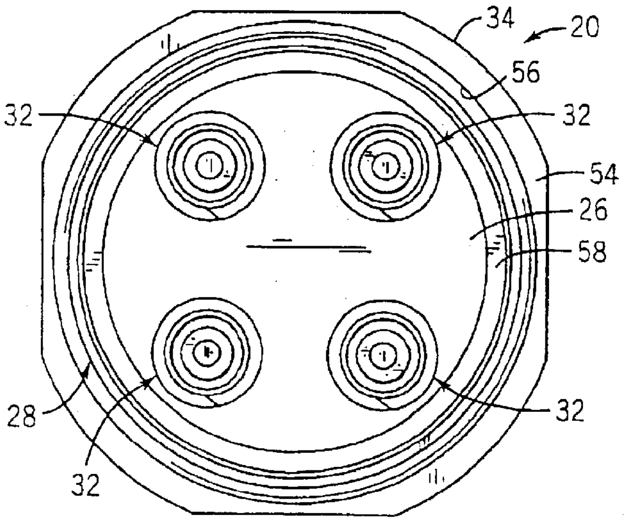
FIG. 3 is a rear plan view of the multiple jack bulkhead feedthrough adapter illustrated in FIGS. 1 and 2 with the fastener nut removed for clarity.

FIGS. 1 through 3 show a multiple jack bulkhead feedthrough adapter 20 which is constructed in accordance with a first embodiment of the present invention. The multiple jack bulkhead feedthrough adapter 20 includes a generally cylindrical base 22 having a first or forward end 24 and a second or rearward end 26. The base 22 further includes a threaded portion 28, which begins at the rearward end 26 of the base 22 and terminates near the forward end 24 of the base 22.

The multiple jack bulkhead feedthrough adapter 20 includes four jacks 30 which extend outwardly from the forward end 24 of the base 22, and four jacks 32 which extend from the rearward end 26 of the base 22. The multiple jack bulkhead feedthrough adapter 20 also includes a flange 34 that is formed integrally with the base 22 and extends generally radially outward at the forward end 24 of the base 22. The base will extend through an aperture in a bulkhead (not shown in FIGS. 1 through 3) with the flange 34 preventing the multiple jack bulkhead feedthrough adapter 20 from passing through the bulkhead. A fastener nut 36 will be threaded onto the threaded portion 28 of the base 22 to secure the multiple jack bulkhead feedthrough adapter 20 in place.

Referring now to FIG. 4 in addition to FIGS. 1 through 3, it may be seen that the interior of the base 22 includes a circular flange 38 spaced inwardly from both the forward end 24 of the base 22 and the rearward end 26 of the base 22. As best shown in FIG. 4, the flange 38 has four evenly spaced cylindrical segments 40 extending therefrom toward the forward end 24 of the base 22, and four evenly spaced cylindrical segments 42 extending therefrom toward the rearward end 26 of the base 22. Each of the cylindrical segments 40 is aligned with one of the cylindrical segments 42. Apertures 44 extend sequentially through the cylindrical segments 40, the flange 38, and the cylindrical segments 42.

The jacks 30 are mounted onto the cylindrical segments 40 at the forward end 24 of the base 22, and the jacks 32 are mounted onto the cylindrical segments 42 at the rearward end 26 of the base 22. The jacks 30 are uniformly spaced apart at the forward end 24 of the base 22 (as are the jacks 32 at the rearward end 26 of the base 22) so as to maximize the number of jacks 30 and 32 that can be mounted onto the base 22.

For example, as shown in FIG. 2, the center-to-center distance spacing or separation "D" between adjacent jacks 30 (and adjacent jacks 32) is the same in both directions. However, different spacings can be used between adjacent jacks 30 and 32 depending on the number and configuration of the jacks 30 and 32 which are included in the multiple jack bulkhead feedthrough adapter 20. While the multiple jack bulkhead feedthrough adapter 20 illustrated in FIGS. 1 through 4 includes four jacks 30 and four jacks 32, it will be appreciated by those skilled in the art that more or fewer jacks 30 and 32 may be used, with the present invention requiring only that there be at least two jacks 30 and two jacks 32.

As illustrated in FIG. 4, the jacks 30 and 32 are aligned in opposing extending pairs, with the jack 30 extending from the forward end 24 of the base 22 and the jack 32 extending from the rearward end 26 of the base 22. Each of the eight jacks 30 or 32 has three generic components, namely a cylindrical shield sleeve 46, a dielectric insulating member 48, and a center signal conductor 50. A cylindrical shield sleeve 46 is press fitted (or welded or soldered) into each of the cylindrical segments 40 and 42 of the base 22. Both the base 22 and the cylindrical shield sleeves 46 are made of a conductive metal. Extending through each cylindrical segment 40 passageway and each cylindrical segment 42 passageway is a dielectric insulating member 48 having a passageway extending therethrough. The dielectric insulating members 48 extend partially into the interior of each of the cylindrical sleeves 46. Located within the passageway in each of the dielectric insulating members 48 is a center signal conductor 50. Accordingly, it will be appreciated by those skilled in the art that each pair of jacks 30 and 32 are electrically interconnected. Finally, it should also be noted that the cylindrical shield sleeves 46 of the jacks 30 and 32 may be manufactured in a unitary fashion with the base 22 if desired.

Referring now to FIGS. 2 through 4, the flange 34 has a front surface 52 and an opposing rear surface 54. The rear surface 54 has formed therein an annular channel 56, into which is placed a sealing member 58. The sealing member 58, which is an O-ring in the preferred embodiment, is partially located within the annular channel 56, and extends outwardly therefrom.

As best shown in FIG. 4, the multiple jack bulkhead feedthrough adapter 20 further includes the fastener nut 36 for securing the multiple jack bulkhead feedthrough adapter 20 to a bulkhead 60 having an aperture 62 extending therethrough. The bulkhead 60 also has an outer surface 64 and an inner surface 66. While the fastener nut 36 is a threaded nut that is threadably received on the threaded portion 28 of the base 22, other securing mechanisms such as spring washers, lock washers, clamps, or the like, may alternatively be employed to secure the multiple jack bulkhead feedthrough adapter 20 in place in the bulkhead 60.

Proper installation of the multiple jack bulkhead feedthrough adapter 20 to the bulkhead 60 includes first extending the rearward end 26 of the base 22 of the multiple jack bulkhead feedthrough adapter 20 through the aperture 62 in the bulkhead 60. Upon full insertion, the rearward end 26 is located rearwardly of the inner surface 66 of the bulkhead 60. In this position, the sealing member 58 located in the annular channel 56 in the inner surface 54 of the flange 34 will engage the outer surface 64 of the bulkhead 60 in a sealing manner.

Finally, the fastener nut 36 is screwed onto the threaded portion 28 of the base 22. When mounted, the multiple jack bulkhead feedthrough adapter 20 "sandwiches" the bulkhead 60 between the flange 34 and the fastener 36. Either before installing the multiple jack bulkhead feedthrough adapter 20 into the bulkhead or after it is installed in the bulkhead, various coaxial cables can be connected to the jacks 30 and 32.

Figure 5:
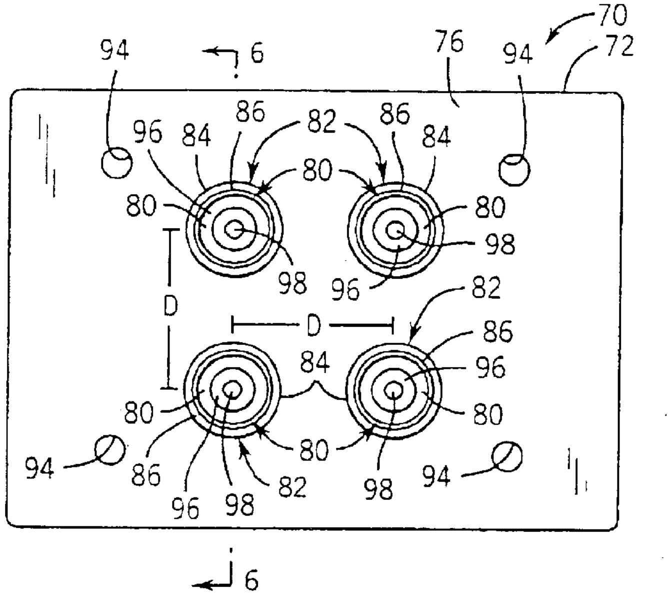
FIG. 5 is a front plan view of a multiple jack bulkhead feedthrough adapter which is constructed in accordance with a second embodiment of the present invention.
Figure 6:
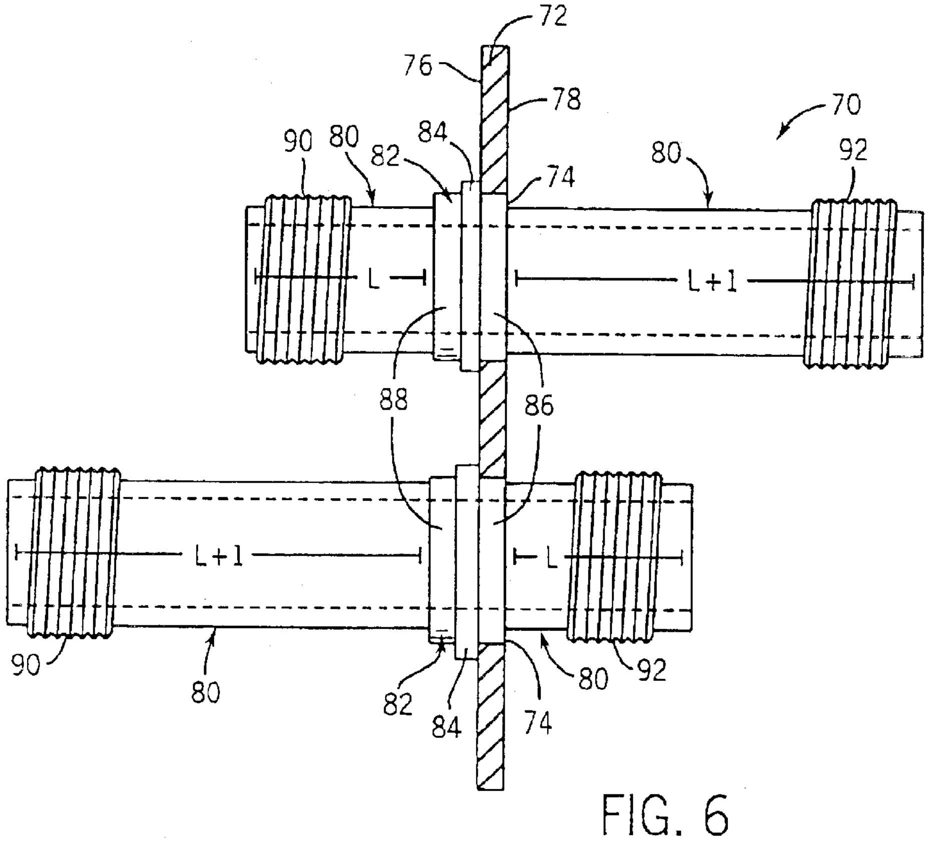
FIG. 6 is a sectional view of the multiple jack bulkhead feedthrough adapter illustrated in FIG. 5, taken along line 6—6 of FIG. 5.

Turning now to FIGS. 5 and 6, a multiple jack bulkhead feedthrough adapter 70 is shown to illustrate a second embodiment of the present invention. The multiple jack bulkhead adapter 70 has a rectangular mounting plate 72, which has four spaced-apart apertures 74 located therein. The mounting plate 72 has a first side 76 and an opposite second side 78. Mounted in the four apertures 74 are four extended length cylindrical shield sleeves 80, which are made out of a conductive metal. Mounted on each of the cylindrical shield sleeves 80 is a hollow cylindrical segment 82, which is located nearer one end of each cylindrical shield sleeve 80 than the other.

The cylindrical segments 82 are interference fit into place (or alternately welded or soldered) onto the cylindrical shield sleeve 80. Located intermediate the ends of cylindrical segment 82 is a radially outwardly extending flange 84. A portion of the cylindrical segment 82, which is at least approximately as thick as the mounting plate 72, extends from each side of the flange 84. The end of the cylindrical segment 82 which is closer to an end of the cylindrical shield sleeve 80 is designated as a first end 86, and the other end is designated as a second end 88.

Each cylindrical segment 82 serves as a mechanism for mounting the cylindrical shield sleeve 80, which is mounted to the mounting plate 72. Each cylindrical shield sleeve 80 is mounted by placing the second end 88 of the cylindrical segment 82 into aperture 74 in the mounting plate 72 from the first side 76 thereof until the flange 84 abuts the first side 76 of the mounting plate 72.

The cylindrical segments 82 fit in the apertures 74 in the mounting plate in an interference fit. Alternately, they may be welded or soldered into place. Upon mounting, a secure attachment is created so that each of the cylindrical shield sleeves 80 is situated perpendicular to the sides 76 and 78 of the mounting plate 72. Each end of the cylindrical shield sleeve 80 defines a jack, with the jacks on the first side 76 of the mounting plate 72 being designated as jacks 90 and the jacks on the second side 78 of the mounting plate 72 being designated as jacks 92. It will be appreciated by those skilled in the art that by alternating the lengths of the cylindrical shield sleeves 80 on each side of the mounting plate 72, the connection of cables thereto will be facilitated, particularly when the cylindrical shield sleeves are located relatively close together.

As shown in FIG. 5, the mounting plate 72 also includes a plurality of apertures 94 located therein for use in mounting the mounting plate 72 to a bulkhead (not shown).

Also referring to FIG. 5, it may be seen that located inside each of the hollow cylindrical shield sleeves 80 is a dielectric insulating member 96 having a passageway extending therethrough. The dielectric insulating members 96 extend within a central portion of the cylindrical shield members 80, but the ends of the dielectric insulating members 96 are spaced away from the ends of the cylindrical shield segments 80. Located within the passageway in each of the dielectric insulating members 96 is a center signal conductor 98. Accordingly, it will be appreciated by those skilled in the art that each pair of jacks 90 and 92 are electrically interconnected.

As best shown in FIG. 5, the jacks 90 and 92 (not shown in FIG. 5) are spaced apart from one another to maximize the number of jacks 90 and 92 that can be mounted within the area of the mounting plate 72, which in turn may correspond to the area of bulkhead aperture available. In one embodiment, the center-to-center distance or separation "D" between adjacent jacks 90 and 92 is the same. However, different spacings can be used between adjacent jacks 90 and 92 depending on the number of jacks and their configuration on a multiple jack bulkhead feedthrough adapter. While the multiple jack bulkhead feedthrough adapter 70 of FIG. 5 includes four jacks 90 and four jacks 92, it may include more or fewer.

Referring now to FIG. 6, it may be seen that the jacks 90 and 92 are positioned within mounting plate 72 such that they extend different lengths from the respective ends 86 and 88 ends of each cylindrical shield sleeve 80. Accordingly, every other jack 90 and 92 will extend length "L" or length "L+1." The alternating multi-length jacks 90 and 92 thereby allow a user to more easily connect a cable to one jack without another adjacent jack interfering with the user's hand movements. Alternatively, the jacks 90 and 92 can each extend at identical lengths (not shown) from the mounting plate 72.

Finally, at least one fastener (not shown), such as a bolt and nut combination is employed to secure the multiple jack bulkhead feedthrough adapter 70 in place at a bulkhead aperture (not shown). While a bolt and nut combination is preferred, other mechanisms such as, but not limited to, rivets, cotter pins, or the like, can also be employed. Although not detailed in the figures, the bulkhead to which the multiple jack bulkhead feedthrough adapter 70 is secured includes an outer surface and an inner surface. An aperture exists between the outer and inner surface of the bulkhead.

Once the multiple jack bulkhead feedthrough adapter 70 is assembled, the jacks 92, which are mounted to extend from the second side 78 of the mounting plate 72, are extended through the aperture. Those skilled in the art will understand that insertion is complete when the jacks 92, and the ends of the cylindrical shield sleeves 80 to which they are attached, extend through the aperture in the bulkhead. The second surface 78 of the mounting plate 72 will be flush against the outer surface of the bulkhead, thereby completely covering the aperture.

Subsequently, the multiple jack bulkhead feedthrough adapter 70 is secured in place by affixing fasteners (not shown), such as, but not limited to, a bolt and nut, through each of the fastener apertures 94 of mounting plate 72 and further into and through the bulkhead.

Referring now to FIGS. 7 through 9, jacks of three different types are illustrated. FIG. 7 shows an SMA jack 100, FIG. 8 shows a TNC jack 102, and FIG. 9 shows a BNC jack 104. While these figures show three different jacks which may be used, it is contemplated that any other type of jack conceivable, including audio or video cable jacks, can be used. Thus, the jacks 30 and 32 in FIGS. 1 through 4, and the jacks 90 and 92 in FIGS. 5 and 6 can be any one or more of these types.

It may therefore be appreciated from the above detailed description of the preferred embodiment of the present invention that it teaches a bulkhead feedthrough adapter no larger than previously known adapters, wherein the bulkhead feedthrough adapter includes multiple jacks so as to make efficient use of minimal aircraft bulkhead aperture area. The multiple jack bulkhead feedthrough adapter of the present invention has multiple jacks with any of a number of different types of connectors for application in any of a number of electrical arts, and which may be used in unlimited industrial settings, thereby not being limited only to the aviation industry.

Although an exemplary embodiment of the multiple jack bulkhead feedthrough adapter has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A multiple jack feedthrough adapter for mounting on a bulkhead having an aperture therein, said feedthrough adapter comprising:

a mounting member for installation onto the bulkhead proximate the aperture located in the bulkhead, said mounting member including a base portion generally cylindrical in shape and having a first side and a second side, said mounting member having threads extending circumferentially of said base portion;

a plurality of see-through extending through said base portion of said mounting member, each feed through having a first jack at a first end thereof and a second jack at a second end thereof, said plurality of see-through located on said mounting member such that each feed through has said first end extending from said first side of said mounting member and said second end extending from said second side of said mounting member, wherein each of said first and second jacks has an outer shield sleeve made of a conductive material located at each of said first and second ends thereof, said outer shield sleeves in each feedthrough being electrically interconnected;

a passageway extending through each of said feedthroughs intermediate said first and second ends thereof;

a hollow insulating member located in each of said passageways;

a center signal conductor located inside said hollow insulating member in each of said feedthroughs; and at least one fastener received on said threaded base portion of said mounting member for securing said multiple jack feedthrough adapter to the bulkhead.

2. The multiple jack feedthrough adapter of claim 1, wherein said first and second jacks consist of at least one of a TNC jack interface, BNC jack interface, and SMA jack interface.

3. The multiple jack feedthrough adapter of claim 1, wherein said base portion comprises a flange extending generally radially therefrom, said flange having a first side and second side.

4. The multiple jack feedthrough adapter of claim 3, further comprising a sealing member at least partially recessed within an annular channel in said first side of said flange, said sealing member adapted to engage the peripheral surface of the bulkhead adjacent to the aperture when the multiple jack feedthrough adapter is mounted on the bulkhead.

5. The multiple jack feedthrough adapter of claim 1, wherein said fastener comprises a nut that is threaded onto said threaded base portion of said mounting member.

6. The multiple jack feedthrough adapter of claim 1 wherein said feedthroughs are respectively located to allow said first end of said feedthroughs to pass through the aperture in the bulkhead when said feedthrough adapter is mounted on the bulkhead.

7. The multiple jack feedthrough adapter of claim 1, wherein each of said plurality of feedthroughs is generally cylindrical in shape.

8. The multiple jack bulkhead feedthrough adapter of claim 1, wherein said mounting member and at least a portion of said plurality of feedthroughs are manufactured in a unitary fashion.

9. The multiple jack bulkhead feedthrough adapter of claim 1, wherein said first and second jacks extend from said mounting member at identical lengths.

10. A method of efficiently placing multiple cables through minimal aircraft bulkhead aperture area, said method comprising the steps of:

providing a multiple jack bulkhead feedthrough adapter that includes a mounting member having a generally cylindrical base portion that has a threads extending circumferentially of the base portion, a mounting flange extending radially from the base portion, and a plurality of feedthroughs extending through the base portion of the mounting member, with each feedthrough including a connector pair;

mounting said multiple jack bulkhead feedthrough adapter in an aperture in said aircraft bulkhead aperture with the mounting flange overlying a surface of the bulkhead adjacent to said aperture;

securing said multiple jack bulkhead feedthrough adapter in said aircraft bulkhead aperture by applying a nut to the threaded base portion and tightening the nut to draw the flange into engagement with said surface of the bulkhead; and connecting at least one cable to said multiple jack feedthrough adapter.

11. A multiple jack feedthrough adapter for mounting on a bulkhead having an aperture therein, said feedthrough adapter comprising:

a mounting member for installation onto the bulkhead proximate the aperture located in the bulkhead, said mounting member including at least one aperture therethrough, said mounting member having a first side and a second side, said mounting member adapted to engage all peripheral bulkhead surface adjacent to the aperture of the bulkhead;

a plurality of feedthroughs respectively located to allow one end of said feedthroughs to pass through the aperture in the bulkhead when said feedthrough adapter is mounted on the bulkhead, each of said feedthroughs having a first jack at a first end thereof and a second jack at a second end thereof, said feedthroughs being mounted in said mounting member such that each jack has said first end extending from said first side of said mounting member and said second end extending from said second side of said mounting member with the axial length of a first plurality of said feedthroughs being greater than the axial length of a second plurality of said feedthroughs from said first side of said mounting member to said first ends of the feedthroughs, thereby facilitating connection of cables to said jacks, wherein each of said first and second jacks has an outer shield sleeve made of a conductive material located at each of said first and second ends thereof, said outer shield sleeves in each mounting member being electrically interconnected;

passageway extending through each of said feedthroughs intermediate said first and second ends thereof;

a hollow insulating member located in each of said passageways;

a center signal conductor located inside said hollow insulating member in each of said feedthroughs; and at least one fastener cooperating with said mounting member for securing said multiple jack feedthrough adapter on the bulkhead, said fastener including at least one bolt extending through said aperture of said mounting member and a nut received on said bolt.

12. The multiple jack feedthrough adapter of claim 11, wherein said mounting member comprises a generally planar mounting plate, said mounting plate having a first side and second side, said mounting plate including at least two apertures therethrough for use in mounting said mounting plate to the bulkhead.

13. The multiple jack feedthrough adapter of claim 12, additionally comprising at least two bolts and two nuts to mount said mounting plate to the bulkhead.

14. The multiple jack feedthrough adapter of claim 12, wherein said feedthroughs are respectively located to allow one end of said feedthroughs to pass through the aperture in the bulkhead when said feedthrough adapter is mounted on the bulkhead.

15. The multiple bulkhead feedthrough adapter of claim 12, wherein said at least one of said jacks further includes an outwardly extending flange, said flange being connected by solder to said mounting plate.

16. A multiple jack feedthrough adapter for mounting on a bulkhead having an aperture therein, said feedthrough adapter comprising:

a mounting member for installation onto the bulkhead proximate the aperture located in the bulkhead, said mounting member including a generally planar mounting plate with at least one aperture therethrough, said mounting plate having a first side and a second side, said mounting plate adapted to engage all peripheral bulkhead surface adjacent to the aperture of the bulkhead;

a plurality of feedthroughs respectively located to allow one end of said feedthroughs to pass through the aperture in the bulkhead when said feedthrough adapter is mounted on the bulkhead, each of said plurality of feedthroughs having a first jack located at a first end thereof and a second jack located at a second end thereof, said jacks mounted in said mounting plate such that each jack has said first end extending from said first side of said mounting plate and said second end extending from said second side of said mounting plate, with the axial length of a first plurality of said feedthroughs being greater than the axial length of a second plurality of said feedthroughs from said first side of said mounting member to said first ends of the feedthroughs, thereby facilitating connection of cables to said jacks, wherein each of said first and second jacks has an outer shield sleeve made of a conductive material located at each of said first and second ends thereof, said outer shield sleeves in each jack sleeve being electrically interconnected;

a passageway extending through each of said feedthroughs intermediate said first and second ends thereof;

a hollow insulating member located in each of said passageways;

a center signal conductor located inside said hollow insulating member in each of said feedthroughs; and at least one fastener for securing said multiple jack feedthrough adapter on the bulkhead.

17. A multiple jack feedthrough adapter for mounting on a bulkhead having an aperture therein, said feedthrough adapter comprising:

a mounting member for installation onto the bulkhead proximate the aperture located in the bulkhead, said mounting member including a base portion generally cylindrical in shape, said base portion having first and second sides, a portion of said base portion including circumferential threads, said mounting member having a flange extending generally radially therefrom near said first side of said base portion, said flange having a first side and a second side;

a sealing member at least partially recessed within a channel portion of said first side of said flange, said sealing member adapted to engage all peripheral bulkhead surface adjacent to the aperture of the bulkhead;

a plurality of feedthroughs respectively located to allow one end of said feedthroughs to pass through the aperture in the bulkhead when said feedthrough adapter is mounted on the bulkhead, each of said plurality of feedthroughs having a first jack at a first end thereof and a second jack at a second end thereof, wherein said first and second jacks extend from said plurality of feedthroughs at identical lengths, said first end of each feedthrough extending from said first side of said mounting member and said second end of each feedthrough extending from said second side of said mounting member, wherein each of said first and second jacks has an outer shield sleeve made of a conductive material located at each of said first and second ends thereof, said outer shield sleeves in each feedthrough being electrically interconnected;

a passageway extending through each of said feedthroughs intermediate said first and second ends thereof;

a hollow insulating member located in each of said passageways;

a center signal conductor located inside said hollow insulating member in each of said feedthroughs; and at least one fastener received on said threaded base portion of said mounting member for securing said multiple jack feedthrough adapter on the bulkhead.

18. A multiple jack feedthrough adapter for mounting on a bulkhead having an aperture therein, said feedthrough adapter comprising:

a mounting member for installation onto the bulkhead proximate the aperture located in the bulkhead, said mounting member having first and second sides, said mounting member including a base portion and a flange extending generally radially from said base portion near said first side of said mounting member, said flange having a first side and a second side;

a sealing member at least partially recessed within a channel portion of said first side of said flange, said sealing member adapted to engage all peripheral bulkhead surface adjacent to the aperture of the bulkhead;

a plurality of feedthroughs extending through said base portion of said mounting member, said feedthroughs located to allow one end of said feedthroughs to pass through the aperture in the bulkhead when said feedthrough adapter is mounted on the bulkhead, each of said plurality of feedthroughs having a first jack at a first end thereof and a second jack at a second end thereof, said first end of each feedthrough extending from said first side of said mounting member and said second end of each feedthrough extending from said second side of said mounting member, wherein each of said first and second jacks has an outer shield sleeve made of a conductive material located at each of said first and second ends thereof, said outer shield sleeves in each feedthrough being electrically interconnected;

a passageway extending through each of said feedthroughs intermediate said first and second ends thereof;

a hollow insulating member located in each of said passageways;

a center signal conductor located inside said hollow insulating member in each of said feedthroughs; and at least one fastener received on said base portion and cooperating with said flange to define a gap for receiving a portion of the bulkhead including said peripheral bulkhead surface when said multiple jack feedthrough adapter is mounted on the bulkhead for securing said multiple jack feedthrough adapter on the bulkhead.

* * * * *